United States Patent [19]

Buchner et al.

[11] Patent Number: 4,959,767
[45] Date of Patent: Sep. 25, 1990

[54] PARAMETER ESTIMATION TECHNIQUE FOR CLOSED LOOP SYSTEM

[75] Inventors: Marc Buchner, Beachwood, Ohio; John D. Lane, McLean, Va.; Ken Loparo; Thomas J. Scheib, both of Chesterland, Ohio

[73] Assignee: Elsag International B.V., Amsterdam, Netherlands

[21] Appl. No.: 275,813

[22] Filed: Nov. 23, 1988

[51] Int. Cl.$^5$ .............................................. G05B 13/02
[52] U.S. Cl. .................................... 364/151; 364/157; 364/177
[58] Field of Search .............................. 364/148–151, 364/157–159, 177

[56] References Cited

U.S. PATENT DOCUMENTS

| | | | |
|---|---|---|---|
| 3,798,426 | 3/1974 | Bristol, II | 364/177 |
| 4,052,642 | 10/1977 | Speth et al. | 364/177 |
| 4,054,780 | 10/1977 | Bartley et al. | 304/177 |
| 4,232,364 | 11/1980 | Bibbero | 364/159 |
| 4,602,326 | 7/1986 | Kraus | 364/158 |
| 4,639,853 | 1/1987 | Rake et al. | 364/150 |
| 4,768,143 | 8/1988 | Lane et al. | 364/157 |
| 4,814,968 | 3/1989 | Fukumoto | 364/150 |

Primary Examiner—Jerry Smith
Assistant Examiner—Paul Gordon
Attorney, Agent, or Firm—Vytas R. Matas; Robert J. Edwards

[57] ABSTRACT

An identification technique that includes a closed loop parameter estimation algorithm for process gain, time constant and deadtime. The estimation algorithm uses time integrals of system variables responding to a step input. Proper selection of the integrals (control areas) results in a set of equations which are solvable for desired process parameters.

5 Claims, 1 Drawing Sheet

PARAMETER ESTIMATION TECHNIQUE FOR CLOSED LOOP SYSTEM

TECHNICAL FIELD

The present invention relates, in general, to a closed loop process control system and, more particularly, to a control system that utilizes parameter estimation techniques.

BACKGROUND ART

Industrial processes with large, unknown and/or time varying process delays are difficult to control. Self-tuning, in its present form, is typically inapplicable to this class of processes due to their reliance on recursive least squares parameter estimation and the PID control algorithm. Recursive least squares parameter estimation techniques typically fail because of a requirement for explicit knowledge of the process deadtime. Similarly, control systems utilizing a PID controller are unable to directly compensate for process deadtime. To maintain loop stability, these control systems must be detuned, degrading overall controller performance.

One approach for extending self-tuning control to the foregoing class of processes is to join a recursive least squares parameter estimation algorithm with a deadtime estimator and augment the control function with deadtime compensation. Two particular methods, one employing a bank of estimators with different assumed values for the deadtime, and the second employing a single estimator to identify a set of parameters extended over a time period so as to include an assumed deadtime, have received significant attention. Unfortunately, these techniques have proven impractical for general purpose application in an industrial setting.

Because of the foregoing, it has become desirable to develop a self-tuning control technique that incorporates both a parameter estimation algorithm and an algorithm for deadtime estimation.

SUMMARY OF THE INVENTION

The present invention solves the problems associated with the prior art and other problems by providing a control technique that can include both a recursive least squares parameter estimation algorithm and a deadtime estimation algorithm. The deadtime estimation algorithm uses time integrals of system variables responding to a step or impulse input. Proper selection of the integrals (control areas) results in a set of equations which are solvable for the process parameters. The utilization of control areas for parameter estimation permits identification of process deadtime. The smoothing effects of integration attenuates the effects of process noise on the parameter estimates.

DESCRIPTION OF THE PREFERRED EMBODIMENT

Figure 1:
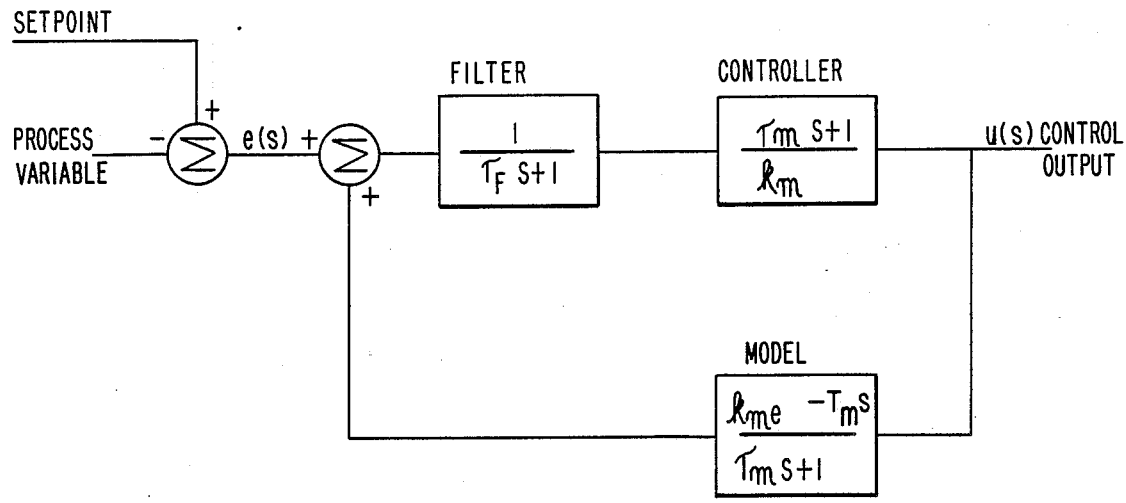
FIG. 1 is a schematic diagram of a model based controller.

Referring now to the drawings where the illustrations are for the purpose of describing the preferred embodiment of the present invention and are not intended to limit the invention hereto, FIG. 1 is a schematic diagram of a model based controller having the following transfer function:

$$\frac{V(s)}{e(s)} = \frac{1}{k_m} \left[ \frac{\frac{\tau_m S + 1}{\tau_f S + 1}}{1 - \frac{e^{-TS}}{\tau_f S + 1}} \right] \quad (1)$$

where: $k_m, \tau_m, T_m, \tau_f$ = Controller Parameters

This particular transfer function assumes that the controlled process can be approximated by a first order lag with deadtime. The controller is tuned in terms of the observed process gain, lag time constant, and deadtime. A fourth tuning parameter, the filter time constant, specifies the desired time response of the process variable to a change in setpoint or to a disturbance.

The self-tuning control system couples a variable version of recursive least squares parameter estimation with the model based controller. The derivation of the recursive least squares algorithm is well known in the art and are incorporated herein by reference. The use of this self-tuning control system is constrained to processes with a known and fixed process delay or to processes where the delay can be measured or inferred on-line. In order to extend the application of this system to processes with unknown or time varying deadtime, a parameter estimation technique is required. The technique of the present invention has the advantage of estimating all process parameters, including deadtime, in a closed loop system. The basic premise relative to this technique is that certain quantitative measurements of the system response to a step setpoint change can be directly related to the process parameters. Using various control areas involving the process output, a set of non-linear algebraic equations utilizing the process parameters can be developed and solved.

The following steps describe the procedure used for estimating the deadtime and process parameters of a first order linear system using the controller shown in FIG. 1:

(a) The setpoint to the controller is increased or decreased by a prescribed amount to start the estimation procedure.

Figure 2:
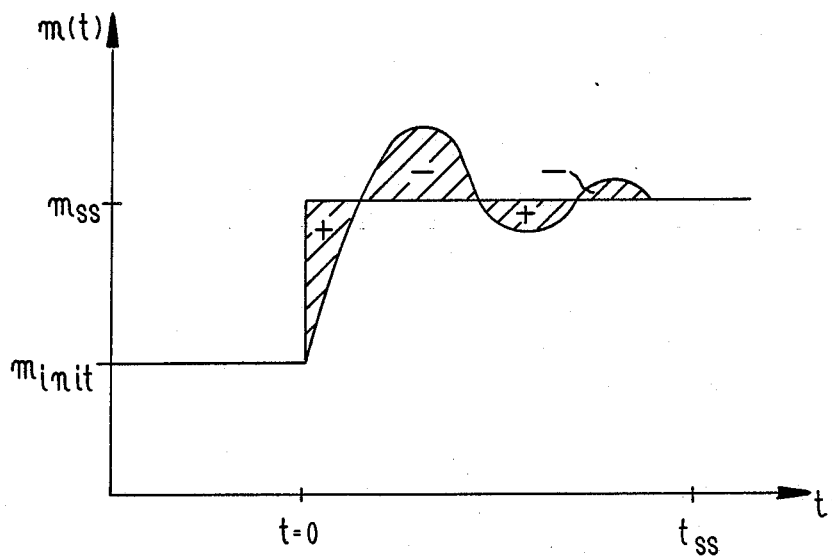
FIG. 2 illustrates the calculation of the time integral shown in equation (2).

(b) The integrals in equations 2 and 3 shown below are calculated numerically as the response to the setpoint change. The values of both these integrals converge as the process output approaches the new setpoint. Therefore, these integrals can be calculated over the finite time horizon from $t=0$ to $t=t_{ss}$, as shown in FIG. 2.

$$I_1 = \frac{1}{\Delta SP} \int_0^\infty [m_{ss} - m(t)]dt \quad (2)$$

$$I_2 = \frac{1}{\Delta SP} \int_0^\infty [m_{ss} - m(t)]e^{-\alpha t}dt \quad (3)$$

where:
$I_1, I_2$ = Control Area Integrals
$m_{ss}$ = Final Value, Control Output
$m(t)$ = Control Output at time t
$\Delta sp$ = Change in setpoint
$\alpha$ = Weighting Parameter = $(\tau_m + T_m)^{-1}$ (c) After observing the process response to a step setpoint change, equations 4 through 6 shown below are used to estimate the process parameters.

$$k_{est} = \frac{\Delta SP}{m_{ss} - m_{init}} \quad (4)$$

$$\tau_{est} = Z \frac{1}{\alpha} \ln\left[\frac{a\tau_{est} - b}{c}\right] \quad (5)$$

$$T_{est} = Z - \tau_{est} \quad (6)$$

where:
$k_{est}$, $\tau_{est}$, $T_{est}$ = Estimated Parameters
$m_{init}$ = Initial Value, Control Output and:

$$Z = \frac{k_m}{k_{est}}(\tau_f + \tau_m) - k_{est} I_1$$

$$a = -\left[\alpha(\tau_f \alpha + 1 + e^{-T_m \alpha}) + \frac{k_{est}\alpha(\tau_m \alpha + 1)}{k_m(k_{est}I_2 \alpha - 1)}\right]$$

$$b = -\frac{a}{\alpha}$$

$$c = \frac{k_{est}}{k_m}(\tau_m + 1)$$

From the foregoing, it is apparaent that by using time integrals of system variables reacting to a step or inpulse change, a set of equations, solvable for process parameters, results. Furthermore, the use of control areas for parameter estimation permits identification of process deadtime. In addition, the smoothing effects of integration attenuates the effects of process noise on the resulting parameter estimates.

The foregoing deadtime/parameter estimator is designed to detect naturally occurring step setpoint changes and to estimate process parameters when they occur. The estimator continually calculates the average of the process variable over a fixed time horizon using a first order filter. When a setpoint change is detected, the estimator compares the average with the old setpoint to determine if the process was at steady state conditions. If so, the estimation algorithm is run. Should a second setpoint change occur before the estimation is completed, the estimation is aborted.

The user may also select to have the algorithm run on demand or on the occurrence of an event or be time dependent. With respect to these additional modes of operation, the user specifies the direction and magnitude of the setpoint change to be used for the test. Triggering the estimation algorithm results in the following sequence of events:
(a) The estimator waits until it determines that the process is at steady state conditions.
(b) The setpoint is changed to a specified amount by the user.
(c) Parameters are estimated to characterize the process from observation of the closed loop response.
(d) The setpoint is returned to its pre-test value.
(e) A second set of parameters is estimated to characterize the response of the process moving in the opposite direction of the first test. The second test helps to identify overall process response so as to diminish effects caused by non-linearities.
(f) The deadtime/parameter estimator outputs the average of the estimate obtained during the two tests.

The parameter estimates obtained in response to both natural and induced setpoint changes can be used to automatically update the model base controller or can be presented to the operator for review and manual updating.

Certain modifications and improvements will occur to those skilled in the art upon reading the foregoing. It should be understood that all such modifications and improvements have been deleted herein for the sake of conciseness and readability, but are properly within the scope of the following claims.

We claim:
1. A process control system, comprising:
a controller for producing a control output for said process;
means for providing a first response, resulting from a comparison of a process variable and a setpoint, to a summation unit;
a model, connected to said controller and located in a feedback loop, for receiving said control output and providing an output to said summation unit; and
means, connected to said summation unit, for providing a second response to said controller, said controller and said model including algorithm means for updating said model based on estimated process parameters of observed process gain, lag time constant, and deadtime in response to changes in the setpoint, said algorithm means numerically calculating the values of the following control area integrals as the control output approaches the setpoint

$$I_1 = \frac{1}{\Delta SP} \int_0^\infty [m_{ss} - m(t)]dt$$

$$I_2 = \frac{1}{\Delta SP} \int_0^\infty [m_{ss} - m(t)]e^{-\alpha t}dt$$

where:
$I_1$, $I_2$ = Control Area Integrals
$m_{ss}$ = Final Value, Control Output
$m(t)$ = Control Output at time t
SP = Change in setpoint
$\alpha$ = Weighting Parameter = $(\tau_m + T_m)^{-1}$.

2. A method for controlling a process having a controller and a model of the process, and which has unknown or time varying deadtime, by measuring the response to a step setpoint change, which response can be directly related to observed process gain, lag time constant, and deadtime parameters representative of the process to update the model, comprising:
providing a first setpoint to the controller;
providing a process variable to the controller;
providing a first new setpoint to the controller to create a step setpoint change thereto and start an estimation procedure which estimates the process parameters based on an observed process output response to said change;
calculating numerically the values of the following control area integrals $I_1$ and $I_2$ as the process output approaches the first new setpoint $$I_1 = \frac{1}{\Delta SP} \int_0^\infty [m_{ss} - m(t)]dt$$

$$I_2 = \frac{1}{\Delta SP} \int_0^\infty [m_{ss} - m(t)]e^{-\alpha t} dt$$

where:
$I_1$, $I_2$ = Control Area Integrals
$m_{ss}$ = Final Value, Control Output
$m(t)$ = Control Output at time t
$\Delta SP$ = Change in setpoint
$\alpha$ = Weighting Parameter = $(\tau_m + T_m)^{-1}$; and
solving a set of three non-linear algebraic equations which relate the observed process gain, lag time constant, and deadtime, $$k_{est} = \frac{\Delta SP}{m_{ss} - m_{init}}$$

$$\tau_{est} = Z \frac{1}{\alpha} \ln\left[\frac{\alpha \tau_{est} - b}{c}\right]$$

$$T_{est} = Z - \tau_{est}$$

where:
$k_{est}$, $\tau_{est}$, $T_{est}$ = Estimated Parameters
$m_{init}$ = Initial Value, Control Output and:

$$Z = \frac{k_m}{k_{est}}(\tau_f + \tau_m) - k_{est} I_1$$

$$a = -\left[\alpha(\tau_f \alpha + 1 + e^{-T_m \alpha}) + \frac{k_{est} \alpha(\tau_m \alpha + 1)}{k_m(k_{est} I_z \alpha - 1)}\right]$$

$$b = -\frac{a}{\alpha}$$

$$c = \frac{k_{est}}{k_m}(\tau_m + 1)$$

to estimate the process deadtime, process gain and lag time and update the process model using these estimated parameters.

3. The method of claim 2, further including the steps of continually calculating an average of the process variable over a fixed time horizon using a first order filter, and starting the estimating procedure only if a comparison of the average with the first setpoint determines that the process was at steady state conditions.

4. The method of claim 3, further including the step of aborting the estimation procedure if another setpoint change occurs before the estimation procedure is completed.

5. The method of claim 2, further including the step of providing a second new setpoint to the controller to create a setpoint change thereto in an opposite direction with respect to that change created by said first new setpoint, to characterize the overall response of the process and diminish effects caused by non-linearities.

* * * * *